United States Patent
Shpunt

(10) Patent No.: US 8,630,039 B2
(45) Date of Patent: Jan. 14, 2014

(54) OPTICAL DESIGNS FOR ZERO ORDER REDUCTION

(75) Inventor: Alexander Shpunt, Tel Aviv (IL)

(73) Assignee: Primesense Ltd., Tel Aviv (IL)

( * ) Notice: Subject to any disclaimer, the term of this patent is extended or adjusted under 35 U.S.C. 154(b) by 261 days.

(21) Appl. No.: 12/955,939

(22) Filed: Nov. 30, 2010

(65) Prior Publication Data

US 2011/0075259 A1 Mar. 31, 2011

Related U.S. Application Data

(62) Division of application No. 12/330,766, filed on Dec. 9, 2008.

(60) Provisional application No. 61/022,482, filed on Jan. 21, 2008.

(51) Int. Cl.
  *G02B 5/18* (2006.01)
  *G02B 27/46* (2006.01)

(52) U.S. Cl.
  USPC ............... 359/576; 359/562; 359/569

(58) Field of Classification Search
  USPC ................. 359/566, 569, 576, 562
  See application file for complete search history.

(56) References Cited

U.S. PATENT DOCUMENTS

| | | |
|---|---|---|
| 3,796,498 A | 3/1974 | Post |
| 4,850,673 A * | 7/1989 | Velzel et al. ............. 359/566 |
| 5,406,543 A | 4/1995 | Kobayashi et al. |
| 5,477,383 A | 12/1995 | Jain |
| 5,606,181 A | 2/1997 | Sakuma et al. |
| 5,648,951 A | 7/1997 | Kato et al. |
| 5,691,989 A | 11/1997 | Rakuljic et al. |
| 5,742,262 A | 4/1998 | Tabata et al. |
| 5,781,332 A | 7/1998 | Ogata |
| 6,002,520 A | 12/1999 | Hoch et al. |
| 6,031,611 A | 2/2000 | Rosakis et al. |
| 6,560,019 B2 | 5/2003 | Nakai |
| 6,583,873 B1 | 6/2003 | Goncharov et al. |
| 6,611,000 B2 | 8/2003 | Tamura et al. |
| 6,707,027 B2 | 3/2004 | Liess et al. |
| 6,927,852 B2 | 8/2005 | Reel |
| 6,940,583 B2 | 9/2005 | Butt et al. |

(Continued)

FOREIGN PATENT DOCUMENTS

| | | |
|---|---|---|
| CN | 1725042 A | 1/2006 |
| JP | 2011118178 A | 6/2011 |

(Continued)

OTHER PUBLICATIONS

U.S. Appl. No. 12/762,373, filed Apr. 19, 2010.

(Continued)

*Primary Examiner* — Audrey Y Chang
(74) *Attorney, Agent, or Firm* — D. Kliger I.P. Services Ltd.

(57) ABSTRACT

Apparatus for projecting a pattern includes a first diffractive optical element (DOE) configured to diffract an input beam so as to generate a first diffraction pattern on a first region of a surface, the first diffraction pattern including a zero order beam. A second DOE is configured to diffract the zero order beam so as to generate a second diffraction pattern on a second region of the surface such that the first and the second regions together at least partially cover the surface.

16 Claims, 4 Drawing Sheets

(56) References Cited

U.S. PATENT DOCUMENTS

| | | |
|---|---|---|
| 7,112,774 B2 | 9/2006 | Baer |
| 7,227,618 B1 | 6/2007 | Bi |
| 7,304,735 B2 | 12/2007 | Wang et al. |
| 7,335,898 B2 | 2/2008 | Donders et al. |
| 7,700,904 B2 | 4/2010 | Toyoda et al. |
| 2002/0163874 A1 | 11/2002 | Nakanishi et al. |
| 2004/0012958 A1 | 1/2004 | Hashimoto et al. |
| 2004/0082112 A1 | 4/2004 | Stephens |
| 2005/0178950 A1 | 8/2005 | Yoshida |
| 2006/0001055 A1 | 1/2006 | Ueno et al. |
| 2006/0252167 A1 | 11/2006 | Wang |
| 2006/0252169 A1 | 11/2006 | Ashida |
| 2006/0269896 A1 | 11/2006 | Liu et al. |
| 2007/0019909 A1 | 1/2007 | Yamauchi et al. |
| 2008/0198355 A1 | 8/2008 | Domenicali et al. |
| 2008/0212835 A1 | 9/2008 | Tavor |
| 2008/0240502 A1 | 10/2008 | Freedman et al. |
| 2008/0278572 A1 | 11/2008 | Gharib et al. |
| 2009/0090937 A1 | 4/2009 | Park |
| 2009/0096783 A1 | 4/2009 | Shpunt et al. |
| 2009/0183125 A1 | 7/2009 | Magal et al. |
| 2009/0185274 A1 | 7/2009 | Shpunt |
| 2010/0007717 A1 | 1/2010 | Spektor et al. |
| 2010/0013860 A1 | 1/2010 | Mandella et al. |
| 2010/0142014 A1 | 6/2010 | Rosen et al. |
| 2010/0284082 A1 | 11/2010 | Shpunt et al. |
| 2011/0019258 A1 | 1/2011 | Levola |
| 2011/0295331 A1 | 12/2011 | Wells et al. |

FOREIGN PATENT DOCUMENTS

| | | | |
|---|---|---|---|
| WO | 2007/043036 A1 | 4/2007 | |
| WO | 2007/105205 A2 | 9/2007 | |
| WO | 2008/120217 A2 | 10/2008 | |
| WO | 2010/004542 A1 | 1/2010 | |

OTHER PUBLICATIONS

Bradley et al., "Synchronization and Rolling Shutter Compensation for Consumer Video Camera Arrays", IEEE International Workshop on Projector-Camera Systems—PROCAMS 2009, Miami Beach, Florida, 2009.

U.S. Appl. No. 61/372,729, filed Aug. 11, 2010.

U.S. Appl. No. 61/425,788, filed Dec. 22, 2010.

Marcia et al., "Fast Disambiguation of Superimposed Images for Increased Field of View", IEEE International Conference on Image Processing, San Diego, USA, Oct. 12-15, 2008.

U.S. Appl. No. 61/419,891, filed Dec. 6, 2010.

Btendo, "Two Uni-axial Scanning Mirrors vs One Bi-axial Scanning Mirror", Kfar Saba, Israel, Aug. 13, 2008.

Microvision Inc., "Micro-Electro-Mechanical System (MEMS) Scanning Mirror", years 1996-2009.

U.S. Appl. No. 13/008,042, filed Jan. 18, 2011.

U.S. Appl. No. 61/415,352, filed Nov. 19, 2010.

European Patent Application # 11150668.9 Partial European Search Report dated Apr. 1, 2011.

U.S. Appl. No. 12/330,766 Official Action dated Jun. 7, 2011.

Garcia et al., "Projection of Speckle Patterns for 3D Sensing", Journal of Physics, Conference series 139, year 2008.

Garcia et al., "Three-dimensional mapping and range measurement by means of projected speckle patterns", Applied Optics, vol. 47, No. 16, pp. 3032-3040, Jun. 1, 2008.

U.S. Appl. No. 61/521,406, filed Aug. 9, 2011.

U.S. Appl. No. 61/521,395, filed Aug. 9, 2011.

U.S. Appl. No. 13/204,719, filed Aug. 8, 2011.

Fienup, J.R., "Phase Retrieval Algorithms: A Comparison", Applied Optics, vol. 21, No. 15, Aug. 1, 1982.

International Application PCT/IL2008/01592 Search Report dated Apr. 3, 2009.

U.S. Appl. No. 12/955,940 "Optical designs for zero-order reduction" filed on Nov. 30, 2010.

Gerchberg et al., "A Practical Algorithm for the Determination of the Phase from Image and Diffraction Plane Pictures," Optik 35 (1972), pp. 237-246.

Sazbon et al., "Qualitative Real-Time Range Extraction for Preplanned Scene Partitioning Using Laser Beam Coding," Pattern Recognition Letters 26 (2005), pp. 1772-1781.

Moharam et al. "Rigorous coupled-wave analysis of planar-grating diffraction", Journal of the Optical Society of America, vol. 71, No. 6, pp. 818-818, Jul. 1981.

U.S. Appl. No. 12/945,908 "Optical Projector with Beam Monitor" filed on Nov. 15, 2010.

Eisen et al., "Total internal reflection diffraction grating in conical mounting" ,Optical Communications 261, pp. 13-18, year 2006.

O'Shea et al., "Diffractive Optics: Design, Fabrication and Test", SPIE Tutorial Texts in Optical Engineering, vol. TT62, pp. 66-72, SPIE Press, USA 2004.

U.S. Appl. No. 61/300,465 "Integrated photonics module for optical projection" filed on Feb. 2, 2010.

U.S. Appl. No. 61/372,469 "Pattern Projector" filed on Aug. 11, 2010.

U.S. Appl. No. 12/330,766 Official Action dated Dec. 14, 2010.

Ezconn Czech A.S. "Site Presentation", Oct. 2009.

Luxtera Inc., "Luxtera Announces World's First 10GBit CMOS Photonics Platform", Carlsbad, USA, Mar. 28, 2005 (press release).

CN Patent Application # 200880119911.9 Office Action dated Jan. 29, 2012.

International Application PCT/IB2011/053560 Search Report dated Jan. 19, 2012.

U.S. Appl. No. 12/955,940 Office Action dated Jan. 11, 2012.

U.S. Appl. No. 12/762,373 Office Action dated Mar. 7, 2012.

Japanese Patent Application # 2010542733 Office Action dated May 8, 2013.

U.S. Appl. No. 12/330,766 Office Action dated Jul. 16, 2013.

International Application PCT/IB2011/055155 Search Report dated Apr. 20, 2012.

U.S. Appl. No. 12/840,312 Office Action dated Jul. 12, 2012.

U.S. Appl. No. 12/955,940 Office Action dated Jun. 27, 2012.

U.S. Appl. No. 12/945,908 Official Action dated Dec. 5, 2012.

U.S. Appl. No. 13/008,042 Official Action dated Jan. 3, 2013.

U.S. Appl. No. 13/008,042 Office Action dated Jul. 15, 2013.

International Application PCT/IB2013/051986 Search Report dated Jul. 30, 2013.

U.S. Appl. No. 13/567,095 Office Action dated Oct. 1, 2013.

U.S. Appl. No. 13/008,042 Office Action dated Dec. 3, 2013.

\* cited by examiner

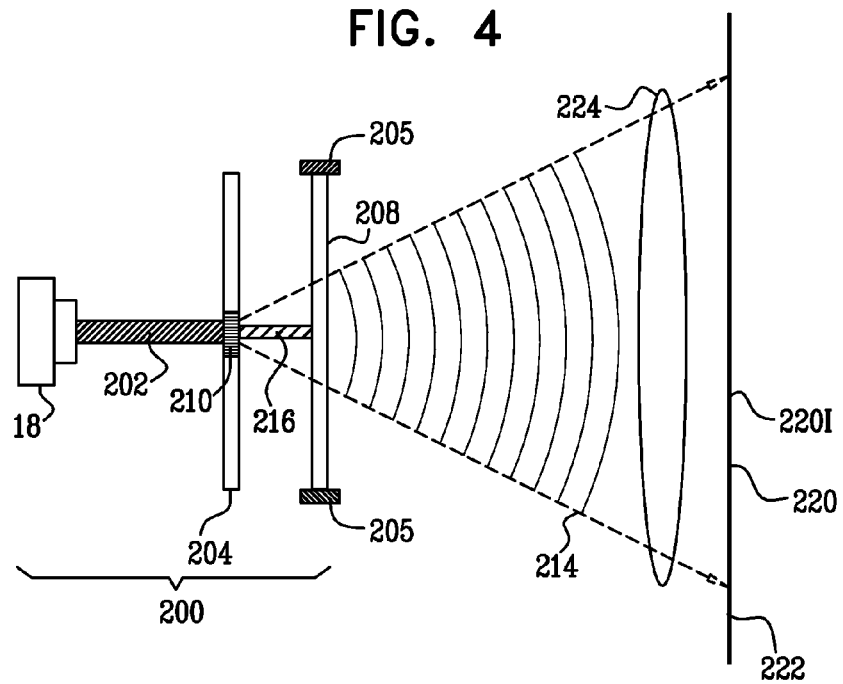

OPTICAL DESIGNS FOR ZERO ORDER REDUCTION

RELATED APPLICATIONS

This application is a divisional of U.S. patent application Ser. No. 12/330,766, filed Dec. 9, 2008, which claims the benefit of U.S. Provisional Patent Application 61/022,482, titled "Optical Designs for Zero-Order Reduction," filed Jan. 21, 2008, which is incorporated herein by reference.

FIELD OF THE INVENTION

The present invention relates generally to optical pattern generation, and specifically to optical pattern generation with reduced uncontrolled zero order energy, particularly (but not exclusively) in configurations using diffractive optical elements.

BACKGROUND OF THE INVENTION

Efficient optical projection of patterns is used in diverse applications such as optical three dimensional (3D) mapping. Such a mapping generates a 3D profile of the surface of an object by processing its optical image. The desired properties of the projected patterns generally depend on the application, but typically include high contrast, high projection efficiency and high uniformity of intensity distribution between the projected beamlets that make up the pattern. The uniformity of the intensity distribution can be expressed in terms of the beamlet-peak-to-average power ratio, i.e., the ratio of the intensity of the strongest beamlet to the mean beamlet intensity, wherein a low ratio corresponds to high uniformity.

Poor uniformity of a projection method may render it unusable for certain applications, such as those applications in which the projected pattern can be seen by the user. Typically, in these cases eye safety regulations dictate the maximal permitted energy flux per unit cross-sectional area or, alternatively, the maximal permitted energy flux in a single collimated beamlet.

Patterns may be projected using diffractive optical elements (DOEs). However, the DOEs may suffer from the so-called zero order problem. A zero order beam is the portion of the incident beam that is not diffracted by the projection setup and thus continues through the system onto the projection volume.

U.S. Pat. No. 6,560,019, to Nakai, whose disclosure is incorporated herein by reference, describes a diffractive optical element having a first and a second grating. The diffraction efficiency of the element is stated to be 97% or better throughout the entire visible spectrum.

U.S. Patent Application 2007/0019909, to Yamauchi et al., whose disclosure is incorporated herein by reference, describes an image display device which included a diffractive optical element and a first "face." The face is provided at a position on which zero order light emitted from the diffractive optical element is not incident, and an image is displayed by light via the first face.

Notwithstanding the above art, an improved method for projecting patterns would be advantageous.

SUMMARY OF THE INVENTION

In an embodiment of the present invention, a first diffractive optical element (DOE) is positioned in proximity to a second DOE. The first DOE diffracts an input beam incident to generate a first diffraction pattern, which comprises a zero order beam. The second DOE receives the zero order beam, and forms a second diffraction pattern therefrom. The two diffraction patterns project into a volume, so that for a given surface within the volume, the first and second diffraction patterns cover respective first and second regions of the surface. Typically, the two regions effectively tile the surface, although there may be relatively minor gaps and/or overlaps between the regions.

Typically, the first region is bounded between a first rectangle and a second, smaller, rectangle inside the first rectangle. The rectangles are symmetrically disposed with respect to each other, having a common center and parallel sides, and the first region corresponds to the area between the two rectangles. The second region is the area bounded by the second rectangle. Alternatively, the regions may be bounded by non-rectangular shapes, one within the other.

By using two DOEs, the zero order beam from the first DOE is effectively neutralized, by being used to generate the second diffraction pattern. Consequently, a peak-to-average power ratio, measured over the two regions, is typically significantly reduced compared to systems using one DOE.

The combination of two DOEs allows the DOEs to be configured so that generation of diffraction patterns can be spread between the DOEs. Such a dispersed generation is herein also termed a distributed design of the two DOEs. A distributed design allows an overall diffraction pattern to be generated that has a substantial reduction in the uncontrolled energy component of the first DOE's zero-order beam, since this zero-order beam is used by the second DOE. In other words, embodiments of the present invention take advantage of, and use, what is typically considered in prior art systems to be an undesirable property, that of excess energy in the zero order beam.

Consequently, diffraction patterns produced by distributed designs of the present invention typically have enhanced overall efficiency compared to the efficiency of generation of the diffraction patterns with a single DOE. In addition, in some embodiments, which are described in detail hereinbelow, contrasts of the beams produced by a distributed design system are typically greater than that of a single DOE, because of the smaller deviation angles required by the two DOEs.

In an alternative embodiment, the first diffraction pattern comprises a plurality of substantially collimated beams. Typically the first DOE is a Dammann grating. The second DOE serves as a pattern generator, to diffract each of the beams to form a respective diffraction pattern. In the distributed design of the alternative embodiment, each diffraction pattern projects onto respective regions of a surface so as to at least partially cover the surface, and the regions may tile the surface. Alternatively or additionally, the diffraction patterns project into sub-volumes that fill a predefined volume. In general, the different beams of the first diffraction pattern need not pass through the same pattern generator, although all the pattern generators can be manufactured on a single DOE. The beams of the first diffraction pattern can each be appropriately directed through a corresponding zone of the second DOE. Thus, the tiles generated in this embodiment may or may not be the same.

In a further alternative embodiment, a DOE forms a diffraction pattern comprising a zero order beam, and an interference filter is positioned to receive the zero order beam. The interference filter is configured to act as a narrow-band rejection filter for radiation incident on the filter at a blocking orientation angle, and to pass radiation incident at angles other than the blocking angle. The filter is positioned and oriented so that the zero order beam impinges on the filter at the blocking angle. Beams of the diffraction pattern other than the zero order beam make angles with the filter that are different from the blocking angle, and so transmit through the filter. The diffraction pattern, absent the zero order beam, thus transmits through the filter so as to project into a predetermined volume, and/or so as to project onto a predefined region of a surface.

Although the embodiments described above refer specifically to diffractive optical elements, the principles of the present invention may alternatively be applied in optical systems that contain refractive elements, and particularly systems that contain both refractive and diffractive elements.

There is therefore provided, in accordance with an embodiment of the present invention, apparatus for projecting a pattern, including a first diffractive optical element (DOE) configured to diffract an input beam so as to generate a first diffraction pattern on a first region of a surface, the first diffraction pattern including a zero order beam. A second DOE is configured to diffract the zero order beam so as to generate a second diffraction pattern on a second region of the surface such that the first and the second regions together at least partially cover the surface.

In a disclosed embodiment, the second DOE includes an optically active region configured to receive the zero order beam, and an optically inactive region configured to transmit the first diffraction pattern absent the zero order beam. Typically, the first region and the second region tile the surface.

There is also provided, in accordance with an embodiment of the present invention, apparatus for projecting a pattern, including a first diffractive optical element (DOE) configured to diffract an input beam so as to generate a plurality of separate output beams. A second DOE is configured to apply a diffractive effect to the plurality of separate output beams so as to generate a respective plurality of diffraction patterns on respective regions of a surface such that the respective regions together at least partially cover the surface.

There is additionally provided, in accordance with an embodiment of the present invention, apparatus for projecting a pattern, including a diffractive optical element (DOE) configured to diffract an input beam having a wavelength so as to generate a diffraction pattern including a zero order beam. A narrow-band filter is tuned to the wavelength of the input beam and is positioned with respect to the DOE so as to cause the diffraction pattern, absent the zero order beam, to impinge on a region of a surface.

The filter may include an interference filter or a grating.

There is further provided, in accordance with an embodiment of the present invention, a method for projecting a pattern, including diffracting an input beam with a first diffractive optical element (DOE) so as to generate a first diffraction pattern on a first region of a surface, the first diffraction pattern including a zero order beam. The zero order beam is diffracted with a second DOE so as to generate a second diffraction pattern on a second region of the surface such that the first and the second regions together at least partially cover the surface.

There is moreover provided, in accordance with an embodiment of the present invention, a method for projecting a pattern, including diffracting an input beam with a first diffractive optical element (DOE) so as to generate a plurality of separate output beams. A diffractive effect is applied to the plurality of separate output beams with a second DOE so as to generate a respective plurality of diffraction patterns on respective regions of a surface such that the respective regions together at least partially cover the surface.

There is furthermore provided, in accordance with an embodiment of the present invention, a method for projecting a pattern, including diffracting an input beam having a wavelength with a diffractive optical element (DOE) so as to generate a diffraction pattern, which includes a zero order beam. A narrow-band filter, which is tuned to the wavelength of the input beam, is positioned with respect to the DOE so as to cause the diffraction pattern, absent the zero order beam, to impinge on a region of the surface.

The present invention will be more fully understood from the following detailed description of the embodiments thereof, taken together with the drawings in which:

BRIEF DESCRIPTION OF THE DRAWINGS

FIG. 4 is a schematic diagram of a further alternative optical apparatus, according to an embodiment of the present invention.

DETAILED DESCRIPTION OF EMBODIMENTS

In the specification and in the claims, a tiling of a region of a plane is assumed to comprise a collection of plane figures, or tiles, that fill the region with no significant overlaps and with no significant gaps.

Figure 1A:
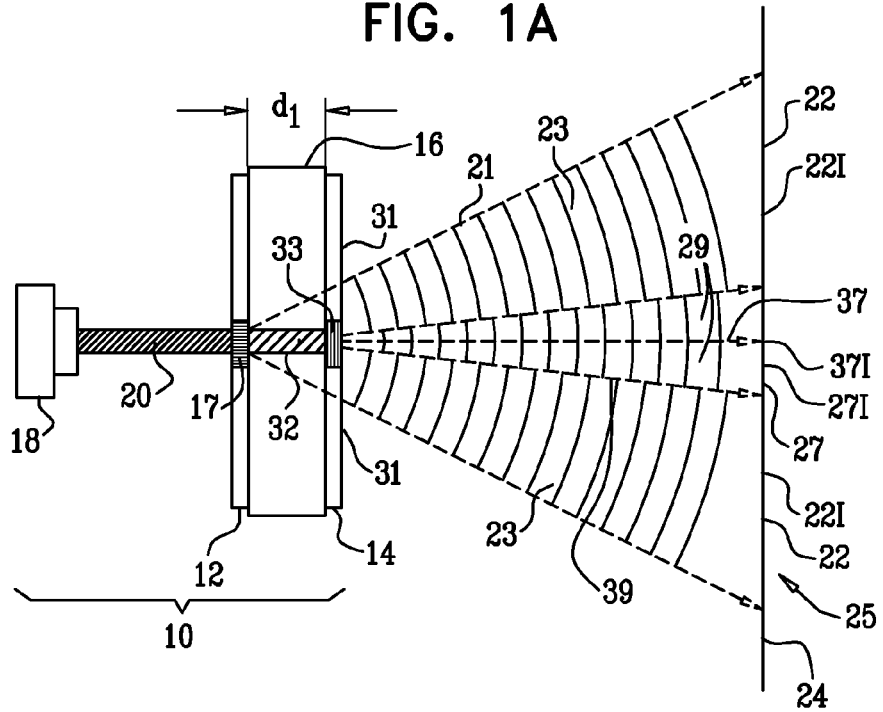
FIG. 1A is a schematic side view of an optical apparatus.
Figure 1B:
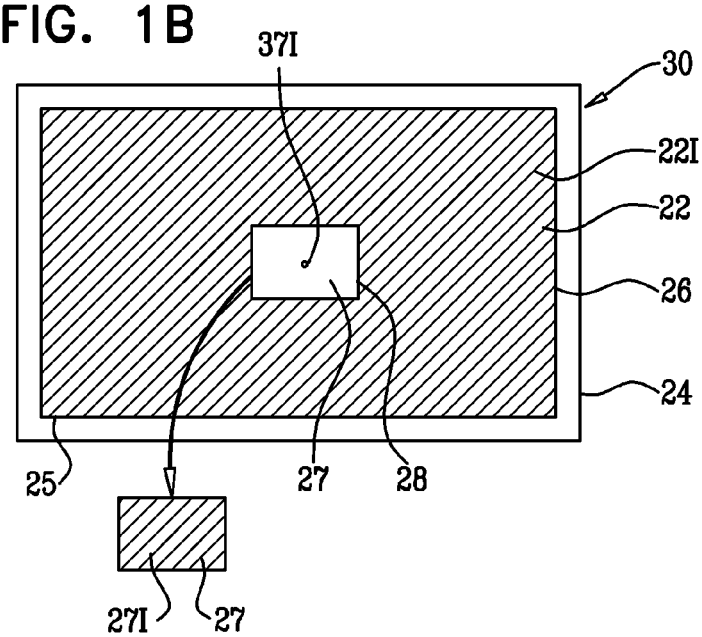
FIG. 1B is a schematic diagram illustrating regions projected onto a plane by the apparatus, according to an embodiment of the present invention.

Reference is now made to FIG. 1A, which is a schematic side view of an optical apparatus 10, and to FIG. 1B, which is a schematic diagram illustrating regions upon which apparatus 10 projects, according to an embodiment of the present invention. Apparatus 10 comprises a first diffractive optical element (DOE) 12, and a second DOE 14. By way of example, in the following description DOE 12 and DOE 14 are assumed to be substantially parallel to each other, being separated by a distance "$d_1$." However, the two DOEs do not need to be parallel to each other, and may be aligned with respect to each other at any convenient angle. In apparatus 10 DOE 12 and DOE 14 are assumed, by way of example, to be formed on first and second surfaces of a single transparent optical element 16. In alternative embodiments, DOE 12 and DOE 14 may be formed on separate optical elements. Although DOE 12 and DOE 14 are transmissive elements, the principles of this embodiment and of the other embodiments described hereinbelow may also be implemented, mutatis mutandis, using reflective DOEs or a combination of transmissive and reflective DOEs.

A beam generator 18, typically a laser, generates an optical input beam 20 having a wavelength $\lambda_1$. Typically, for example in the case that generator 18 comprises a multi-mode laser, beam 20 is has an elliptical cross-section. In some embodiments beam 20 may have a circular cross-section. Beam 20 may be collimated or non-collimated, and in the non-collimated case, the degree of non-collimation, i.e., the divergence or the convergence of the beam, is typically set so that diffraction orders from different portions of the non-collimated beam do not overlap. Hereinbelow, by way of example, beam 20 is assumed to be a collimated beam.

As is described in more detail below, DOE 12 and DOE 14 generate respective diffraction patterns, which each comprise a multiplicity of beams.

Element 16 is positioned so that DOE 12 receives the beam, and by way of example DOE 12 is assumed to be approximately orthogonal to the beam. DOE 12 has an optically active portion 17 which is configured to correspond to the cross-section of beam 20. Portion 17 is also configured so that an overall diffraction pattern 21 formed from beam 20 by element 12 comprises a first diffraction pattern 23 projecting into the far field of the element and a zero order beam 32. First diffraction pattern 23 projects onto a region 22 of a plane 24 a corresponding first diffraction image 22I. (Although, for convenience and clarity of illustration, the embodiment of FIGS. 1A and 1B relates to projection of diffraction patterns onto a specific plane, in practice the patterns are projected into a volume, as shown in the figures that follow, and this volume is subtended by plane 24.) By way of example, the first diffraction image is hereinbelow assumed to comprise a set of distributed spots 30, each spot corresponding to a diffraction order beam of DOE 12. In one embodiment, of the order of $10^6$ diffraction orders are generated by DOE 12. Of the order of $10^5$ of these diffraction order beams are used to generate spots, and the remaining diffraction order beams are suppressed.

However, it will be understood that first diffraction image 22I may not comprise distinct spots, and could, for example, comprise a set of lines of similar or different intensities, an image having one or more areas of graduated intensities, or an image comprising a combination of spots, lines and/or graduated intensity areas.

The projection of first diffraction pattern 23 is via an optically inactive transparent portion 31 of DOE 14, so that first diffraction pattern 23 is substantially unaltered by portion 31. FIG. 1B illustrates schematically the set of spots 30. The spots are formed, by DOE 12, as diffraction image 22I on region 22 of plane 24.

By way of example, region 22 is hereinbelow assumed to have as an outer bound a rectangle 26, and as an inner bound a rectangle 28, the two rectangles having a common center. Thus, region 22 is in effect an "annular" region having a central area 27 wherein no diffraction image is formed from DOE 12. The annular form of region 22 is a consequence of diffraction pattern 23 being in the form of a hollow cone or pyramid. However, there is no necessity for region 22 to be this particular annular shape, and typically region 22 may be any convenient annular region. Thus region 22 typically comprises a space of substantially any shape in central area 27 of plane 24, wherein no diffraction image from DOE 12 is formed. In one embodiment, a largest plane angle subtended by rectangle 26, i.e., the angle subtended by corners of the rectangle with respect to primary zero order beam 32, is of the order of 30°.

In addition to forming the first diffraction pattern described above, some of the energy of beam 20 that is diffracted exits DOE 12 as substantially un-deviated zero order beam 32. Beam 32 is typically caused by limitations in the manufacture of DOE 12, but may at least partly be configured into the design and manufacture of the DOE, typically so as to provide sufficient energy in the zero order beam. To distinguish zero order beam 32 from a later zero order beam generated by apparatus 10, beam 32 is also termed herein primary zero order beam 32. Primary zero order beam 32 has a cross-section that is generally similar to that of beam 20.

DOE 14 is configured to receive beam 32 at an optically active portion 33 of the DOE, and to form from the beam an overall diffraction pattern 39 that comprises a second diffraction pattern 29 projecting into the far field of element 14 and a zero order beam 37. DOE 14 is designed so that second diffraction pattern 29 generated by DOE 14 projects a second diffraction image 27I onto central area 27, and typically fills the central area. The filling of area 27 is such that any gap or overlap between second diffraction image 27I and first diffraction image 22I is typically small, so that the two diffraction images taken together cover a portion 25 of plane 24. In one embodiment, any gap or overlap between the images has a linear dimension that is of the order of 0.1% or less than a largest linear dimension of the smaller of the images. For example, if image 27I is smaller than image 22I, and has a largest dimension equal to 100 mm, then the gap or overlap between the two images is of the order of 0.1 mm. Thus, regions 22 and 27 at least partially cover portion 25, and may be configured to effectively tile the portion.

Zero order beam 37, herein also termed secondary zero order beam 37, is substantially undeviated from the direction defined by primary zero order beam 32. Beam 37 projects as a spot 37I, approximately at the center of region 27.

By way of example, a largest plane angle subtended by rectangle 28, i.e., the angle subtended by corners of the rectangle measured with respect to secondary zero order beam 37, is typically of the order of 10°.

While the description above uses plane angles to express the dimensions of the first and second diffraction patterns, it will be appreciated that the dimensions may also be expressed in terms of a first solid angle and a second solid angle respectively subtended by the first and the second diffraction pattern.

The total energy flux of beam 32 is typically of the order of 5% of the incident energy flux of beam 20, for first diffraction pattern 23 as described above. The total energy flux of secondary zero order beam 37 is typically of the order of 1% of that of the primary zero order beam, for a second diffraction pattern as described above. Thus, the energy flux of the secondary zero order beam is less than 0.1%, and is typically of the order of 0.05%, of the total energy flux of beam 20. The reduced energy flux of the secondary zero order beam leads to a significant reduction in the peak-to-average power ratio of the diffracted beamlets, measured over the two regions, compared to systems using one DOE.

In addition to the two diffraction patterns forming images on regions that substantially tile portion 25, in some embodiments the two diffraction patterns are typically configured so that an overall intensity distribution of the diffraction images across portion 25 is generally uniform.

In order to achieve the tiling and overall uniform intensity distribution over portion 25 that are described above, the following interdependent parameters of DOE 12 and DOE 14 may be varied:

The wavelength $\lambda_1$. of beam 20;
Outer and/or inner solid angles of the first diffraction pattern;
The energy flux of the primary zero order beam;
The solid angle of the second diffraction pattern;
The energy flux of the secondary zero order beam;
Geometrical factors such as dimensions of beam 20 and the distance $d_1$ between the DOEs; and
Dimensions of optically active portion 33.

The interdependence of the above parameters will be apparent to those having ordinary skill in the art. For example, as the solid angle of a given diffracted pattern increases, the energy flux in the zero order beams of the respective diffracted pattern tends to increase. Selection of the parameters, as well as other relevant parameters, is typically made using methods known in the art for designing the DOEs as phase masks. For example, the DOEs may be designed using the Gerchberg-Saxton iterative algorithm or one of its variants. Alternatively or additionally, standard or custom software may be used to design the DOEs, using for example, design approaches published in "Phase Retrieval Algorithms: A Comparison," J. R. Fienup, Applied Optics 21, 2758-2769 (1 Aug. 1982).

Figure 3A:
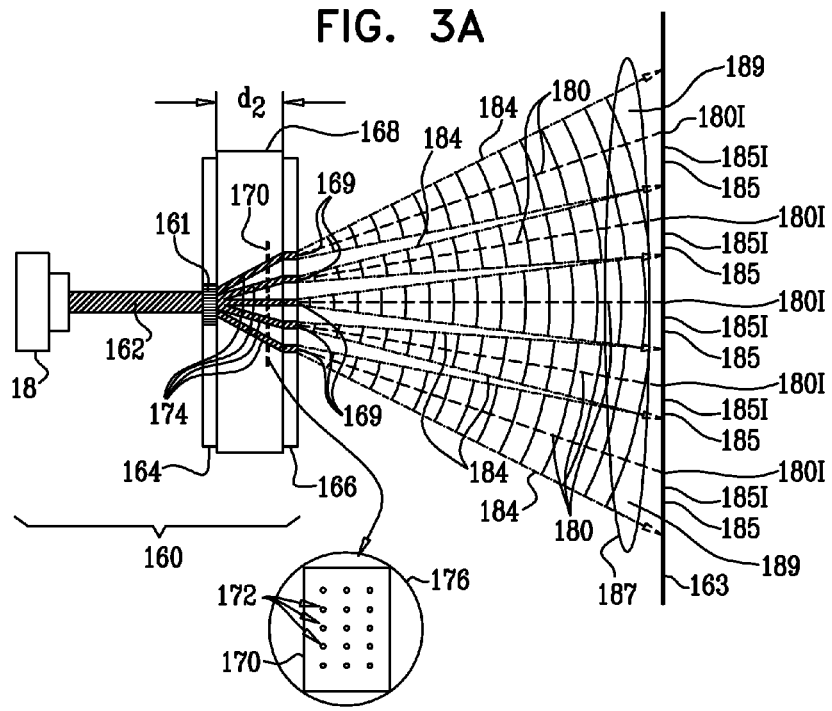
FIG. 3A is a schematic side view of an alternative optical apparatus.
Figure 3B:
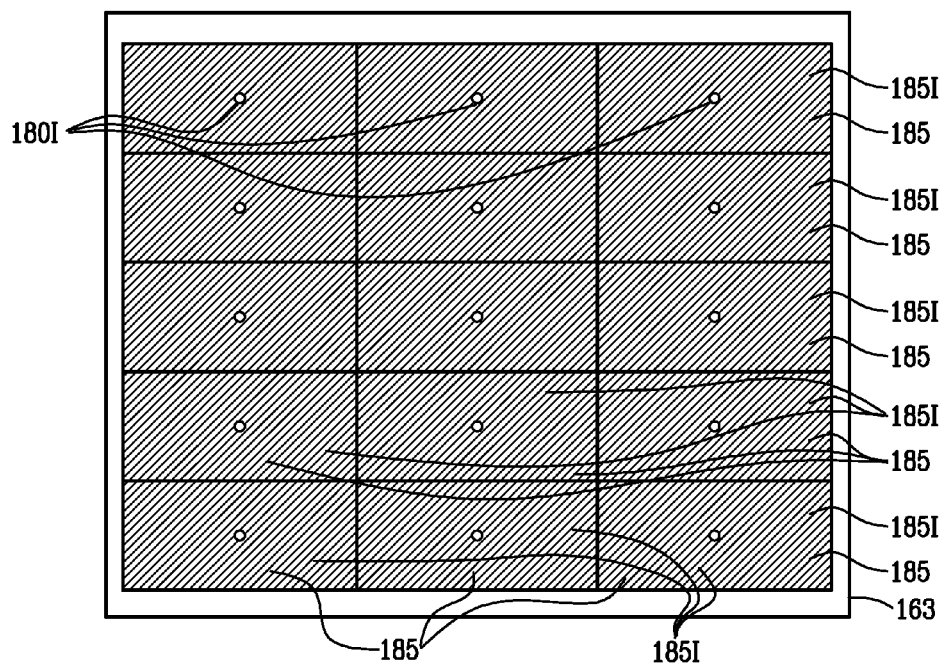
FIG. 3B is a schematic diagram illustrating regions projected onto a plane by the alternative apparatus, according to an embodiment of the present invention.

In some embodiments, DOE 12 and DOE 14 are configured so that the tiling effect described above applies substantially independently of changes in the input beam wavelength $\lambda_1$. An explanation of the effects of change of wavelength on diffraction patterns is given below, with reference to apparatus 160 (FIGS. 3A and 3B). Those having ordinary skill in the art will be able to apply the explanation, mutatis mutandis, to the effects of changes of wavelength $\lambda_1$ on the tiling effect in apparatus 10.

There is no requirement that the overall intensity distribution over portion 25 is uniform, and in some embodiments there may be a relatively large variation in intensity between the two different diffraction patterns. An example of such a variation is described below, in reference to FIGS. 3A and 3B.

Figure 2:
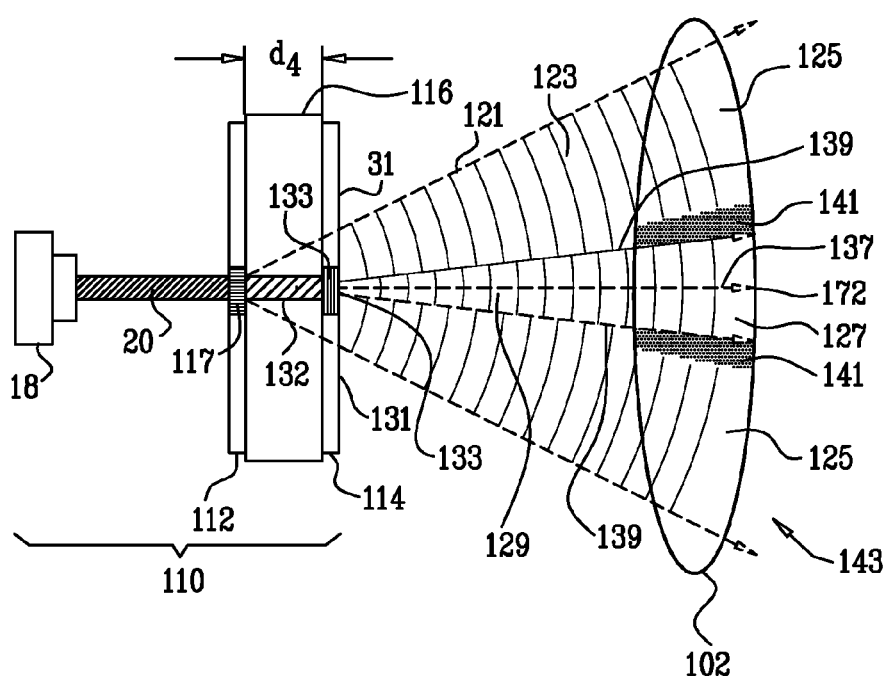
FIG. 2 is a schematic side view of another optical apparatus, according to an embodiment of the present invention.

FIG. 2 is a schematic side view of an optical apparatus 110, according to another embodiment of the present invention. Some of the elements used in apparatus 10 (FIGS. 1A and 1B) and apparatus 110 have generally common functions, and elements indicated by the same reference numerals in apparatus 10 and in apparatus 110 are generally similar in construction and in operation. Apparatus 110 is configured to project diffraction patterns into a volume 102.

Apparatus 110 comprises a first DOE 112 and a second DOE 114, which except as described below, are assumed to operate and to be configured generally as described above for DOE 12 and DOE 14 of apparatus 10. Thus, by way of example, DOE 112 and DOE 114 are assumed to be parallel to each other, being separated by a distance "$d_4$," and to be formed on first and second surfaces of a single transparent optical element 116.

As for apparatus 10, in apparatus 110 beam 20 is assumed by way of example to be collimated.

Element 116 is positioned so that DOE 112 receives beam 20, and is approximately orthogonal to the beam. DOE 112 has an optically active portion 117 which corresponds in dimensions to the cross-section of beam 20. Portion 117 is configured so that an overall diffraction pattern 121 formed from beam 20 by element 112 comprises a first diffraction pattern 123. Pattern 123 has generally similar properties to those of pattern 23, and typically comprises collimated beams, or beams which are focused at respective regions in volume 102, the beams being different diffraction orders formed by diffraction of beam 20. Pattern 123 thus projects into an approximately truncated pyramidal shape 125, having a vacant central region 127, in volume 102. Pattern 121 also comprises a primary zero order beam 132, which has generally similar properties to those of zero order beam 32, and which is directed approximately along an axis of symmetry of shape 125.

The projection of first diffraction pattern 123 is via an optically inactive transparent portion 131 of DOE 114, so that first diffraction pattern 123 is substantially unaltered by portion 131.

DOE 114 is also configured to receive beam 132 at an optically active portion 133 of the DOE, and to form from the beam an overall diffraction pattern 139 that comprises a second diffraction pattern 129 and a secondary zero order beam 137. DOE 114 is designed so that second diffraction pattern 129 projects exiting beams from portion 133 into central region 127, forming an approximately truncated pyramidal shape 129 that typically fills the region. DOE 114 is typically configured so that its exiting beams are collimated or focused in volume 102. It is possible, however, that second diffraction pattern 129 may overlap pyramidal shape 125, at least at some planes within the volume, and such overlap is indicated by a shaded region 141. (For clarity, alterations in lines depicting overall diffraction pattern 139, that occur for such an overlap, are not shown in FIG. 2.) Primary zero order beam 132 and secondary zero order beam 137 typically have similar energy fluxes to those described above for beams 32 and 37 of apparatus 10.

Apparatus 110 is thus able to form a composite diffraction pattern 143, comprising first diffraction pattern 123 and second diffraction pattern 129, projecting into volume 102. As for apparatus 10, by using two DOEs, the second DOE forming its diffraction pattern from the zero order beam of the first DOE, apparatus 110 generates its composite diffraction pattern efficiently, so that there is very little undesired energy in the secondary zero order beam.

Consideration of the operation of apparatus 10 and of apparatus 110 demonstrates that different portions of the combined diffraction pattern are generated by distributing the required diffraction effects between two DOEs. Such a distribution, or dispersal, is herein also termed a distributed design of the two DOEs. Distributed designs of the present invention enable generation of an overall diffraction pattern that reduces the uncontrolled energy component of the first DOE's zero-order beam, since the distributed design uses the zero-order beam to form part of the desired diffraction pattern.

FIG. 3A is a schematic side view of an optical apparatus 160, and FIG. 3B is a schematic diagram illustrating regions projected onto a plane 163 by apparatus 160, according to an embodiment of the present invention. Some of the elements used in apparatus 10 and apparatus 160 have generally common functions, and elements indicated by the same reference numerals in apparatus 10 and in apparatus 160 are generally similar in construction and in operation.

In apparatus 160 beam generator 18 generates an optical input beam 162 which is generally similar to beam 20, and which has a wavelength $\lambda_2$. Apparatus 160 comprises a first DOE 164, also termed a primary DOE 164, which receives beam 162 in an optically active region 161 of the DOE. The shape of region 161 may be configured to correspond with the cross-section of beam 162. The apparatus also comprises a second DOE 166, which is also termed secondary DOE 166. By way of example, in the following description DOE 164 and DOE 166 are assumed to be substantially parallel to each other, being separated by a distance "$d_2$." However, the two DOEs do not need to be parallel to each other, and may be aligned with respect to each other at any convenient angle. By way of example DOE 164 and DOE 166 are assumed to be formed on opposing surfaces of one transparent element 168. However, in some embodiments, DOE 164 and DOE 166 may be formed on separate optical elements.

In contrast to apparatus 10, primary DOE 164 is configured to generate a multiplicity of approximately collimated relatively narrow beams 174 exiting the DOE. DOE 164 may advantageously be formed as a Dammann grating. In one embodiment DOE 164 is configured so that beams 174 intersect an imaginary plane 170, that is orthogonal to input beam 162, with a symmetrical pattern of spots 172. One example of such a symmetrical pattern is illustrated in diagram 176, wherein spots 172 are located at corners of congruent rectangles which tile a portion of plane 170. Other examples of symmetrical patterns of spots that may be produced from the exiting beams of DOE 164 will be apparent to those having ordinary skill in the art, and are included within the scope of the present invention. In another embodiment the pattern of spots 172 formed on plane 170 is partly symmetrical or not symmetrical. For example, the symmetrical pattern of congruent rectangles described above may be distorted so that the corners of the rectangles become corners of non-rectangular quadrilaterals, as is the case when there is a pincushion type of distortion, which may be generated by DOE 164. Typically, one of beams 174 is substantially un-deviated with respect to input beam 162, and so is equivalent to a zero order beam for DOE 164.

Primary DOE 164 is typically formed so that beams 174 have approximately equal energy fluxes and generally similar cross-sections. As for apparatus 10, primary DOE 164 may be configured so that the overall energy in the beam 174 that corresponds to the zero order beam, including the energy because of manufacturing limitations, has a desired value.

Secondary DOE 166 is configured to receive beams 174, at respective optically active regions 169. Regions 169 form from each of the beams respective overall diffraction patterns 184. Thus, in contrast to apparatus 10 where the secondary DOE diffracts one zero order beam received from the primary DOE, in apparatus 160 the secondary DOE effectively diffracts a multiplicity of beams 174 received from the primary DOE.

Each diffraction pattern 184 produced by a respective beam 174 typically has a relatively narrow solid angle, and comprises a respective zero order beam 180, herein also termed respective secondary zero order beams 180. In one embodiment, each diffraction pattern 184, measured orthogonal to its beam 180, has a distorted rectangular cross-section, the distortion typically comprising a pincushion type of distortion. Each secondary zero order beam 180 has an energy flux that is typically of the order of 1% or less than the energy flux of its respective beam 174, and each secondary zero order beam forms a spot 180I on plane 163. If each beam 174 has approximately the same energy flux, and if there are 15 beams 174, each secondary zero order beam 180 has an energy flux of the order of 0.07% or less of input beam 162.

Each diffraction pattern 184 is assumed to project a respective diffraction image 185I onto a region 185 of a section 178 of plane 163, orthogonal to input beam 162. Regions 185 are generally similar in shape to each other and are approximately centered on their respective spots 180I. In one embodiment regions 185 are rectangles distorted by the pincushion effect described above. DOE 164 and DOE 166 are configured so that regions 185, and thus images 185I, cover section 178. Typically, there is little or no overlap of regions 185, so that the regions approximately tile section 178. In some embodiments diffraction images 185I generated by secondary DOE 166 may comprise a plurality of spots, each spot corresponding to a diffraction order of the DOE, generally as described above for apparatus 10. However, DOE 166 may be configured to generate other diffraction images, such as the other images described above with reference to apparatus 10. In some embodiments, DOE 164 and DOE 166 are configured so that an overall intensity distribution of images 185I across section 178 is generally uniform, and so that there is little or no apparent division between adjacent images 185I. As for apparatus 10, there is no requirement that the intensity distribution of images 185I is generally uniform, and in some embodiments an intensity ratio between a low intensity image 185I and a high intensity image 185I can be of the order of 1:2.

In some embodiments of the present invention, DOE 164 and DOE 166 are configured so that the tiling effect described above occurs substantially independently of any change in wavelength $\lambda_2$ of input beam 162. If DOE 164 comprises a Dammann grating, an increase or decrease of $\lambda_2$ effects a corresponding increase or decrease in the angles made by beams 174 with the input beam. Such changes of angles may be accommodated by forming regions 169 to be sufficiently large to receive the differently angled beams. In addition, with the increase or decrease of $\lambda_2$, there is a corresponding increase or decrease of the solid angles of diffraction patterns 184. The two effects act together, and tend to maintain the tiling effect described above, the change of angles of beams 174 being compensated for by the change of solid angles of diffraction patterns 184. The compensation increases as the distance $d_2$ decreases, so that for small values of $d_2$ the approximate tiling is substantially maintained for changes of wavelength $\lambda_2$, and is exactly maintained if $d_2$ is effectively zero.

The description above illustrates how DOE 164 and DOE 166 may be configured in a distributed design format to project a desired image onto plane 163. In practice, however, the images are projected into a volume, such as a volume 187 shown in FIG. 3A, and illuminate whatever surface is present in the volume, such as plane 163 or a non-planar surface. Each diffraction pattern 184 projects into a respective sub-volume 189 of volume 187, the sub-volumes typically completely filling volume 187. In FIG. 3A only two sub-volumes 189 are shown, for clarity.

As in the preceding embodiments, the principles of the embodiments of FIGS. 3A and 3B may be implemented using other arrangements of DOEs. For example, the order of elements 166 and 164 in the optical path may be reversed. Additionally or alternatively, at least one of the DOEs may be reflective, rather than transmissive as shown in the figure.

FIG. 4 is a schematic diagram of an optical apparatus 200, according to an embodiment of the present invention. Some of the elements used in apparatus 10 and apparatus 200 have generally common functions, and elements indicated by the same reference numerals in apparatus 10 and in apparatus 200 are generally similar in construction and in operation.

In apparatus 200 beam generator 18 generates an optical input beam 102 which is generally similar to beam 20, and which has a wavelength $\lambda_3$. Apparatus 200 comprises a DOE 204 which in one embodiment is oriented normal to beam 202 and which receives the beam in an optically active region 210 of the DOE having dimensions corresponding to the cross-section of the beam. Although it may be convenient to configure apparatus 200 so that DOE 204 is normal to the beam, there is no requirement that the beam and the DOE are oriented normally. The apparatus also comprises an optic element (OE) 208, which is mounted separately from DOE 204 in an adjustable mount 205.

Region 210 forms an overall diffraction pattern 214, which is generally conical or pyramidal in form, and which comprises a zero order beam 216.

OE 208 is configured as a notch filter that is tuned to be able to reject wavelength $\lambda_3$. In some embodiments, the notch filter comprises a narrow band-reject interference filter. These embodiments use an angular selective property of narrow band-reject interference filters. Thus, a filter that is configured to reject radiation of wavelength $\lambda_3$ rejects the radiation efficiently when the radiation is incident on the filter at a given nominal angle of incidence. The filter transmits radiation of wavelength $\lambda_3$ that is incident at angles other than the nominal angle of incidence.

In other embodiments, OE 208 comprises a grating-type notch filter, such as a volume holographic grating (VHG) or a volume Bragg grating (VBG). (Volume holographic gratings are described, for example, in U.S. Pat. No. 5,691,989, whose disclosure is incorporated herein by reference, and are available from Ondax, Inc., of Monrovia, Calif.)

OE 208 is typically configured to have the same band-reject line width as the line width of beam 202. Thus, if generator 18 is a laser diode producing a beam having a full width at half maximum (FWHM) of 1 nm, OE 208 is configured to have the same FWHM for a selected nominal angle of incidence. In some laser configurations, a grating element, such as a VHG, is used as the output coupler of the laser cavity, reflecting the notch wavelength back into the cavity and thus locking the laser at this wavelength. A second grating element of the same type can be used as OE 208. This element will precisely block the zero order of the diffraction pattern at the laser wavelength.

In operation, mount 205 may be rotated to adjust OE 218, so that the OE absorbs substantially all the energy of zero order beam 216. Typically, after adjustment, the zero order beam and OE 208 form an angle that is close to the selected nominal angle of incidence. Once adjusted, OE 208 transmits substantially all the remaining energy in diffraction pattern 214, since the diffraction pattern (absent the zero order beam) subtends angles at OE 208 different from the angle subtended by the zero order beam. In some embodiments, once OE 208 has been adjusted, it may be cemented to DOE 204 so as to form one composite optical element, by methods which are well known in the optical arts, and mount 205 removed.

DOE 204 and OE 208 are configured so that diffraction pattern 214 projects into a predefined volume 224, generally as described above for apparatus 110. Alternatively, the two elements are configured so that diffraction pattern 214 forms a diffraction image 220I on a region 220 of a plane 222. The diffraction image is typically similar to one or more of the images described above with reference to apparatus 10.

Although the description above has assumed that DOE 204 and OE 208 are formed on distinct elements, in some embodiments the DOE and the interference filter may be formed on opposite surfaces of one single transparent element. For the single element case, the two opposite surfaces may or may not be configured to be parallel. In these embodiments the single element may be adjusted by rotating it with respect to beam 202, so that substantially all the energy of zero order beam 216 is absorbed.

Alternatively, in a reflective configuration, OE 208 may be replaced by a notch-pass filter, which is aligned to permit the zero order beam to pass through it while reflecting the rest of the diffraction image into the desired volume.

It will be understood that elements of the embodiments described above may be combined to form other embodiments of the present invention. For example, an interference filter similar to that described for apparatus 200 (FIG. 4) may be added after DOE 14 of apparatus 10 (FIG. 1A), so as to substantially zero the energy in secondary zero order beam 37, without substantially affecting diffraction patterns 23 and 29. A similar addition may be made after DOE 114 of apparatus 110. Other advantageous combinations will be apparent to those having ordinary skill in the art.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

I claim:

1. Apparatus for projecting a pattern, comprising:
a first diffractive optical element (DOE) configured to diffract an input beam so as to generate a first diffraction pattern on a first region of a surface, the first diffraction pattern comprising a zero order beam; and
a second DOE, which comprises:
an optically active region configured to receive the zero order beam and to diffract the zero order beam so as to generate a second diffraction pattern on a second region of the surface; and
an optically inactive transparent region configured to transmit the first diffraction pattern absent the zero order beam so that the first diffraction pattern is unaltered by the optically inactive transparent region,
such that the first and the second regions together at least partially cover the surface.

2. The apparatus according to claim 1, wherein the first and the second DOEs are formed on one optical element.

3. The apparatus according to claim 1, wherein the first and the second DOEs are formed on separate optical elements.

4. The apparatus according to claim 1, wherein the second diffraction pattern comprises a further zero order beam, and wherein an energy flux of the further zero order beam is less than 0.1% of an energy flux of the input beam.

5. The apparatus according to claim 1, wherein the input beam has an input beam wavelength, and wherein the first DOE and the second DOE are configured so that the first and the second regions at least partially cover the surface independently of the input beam wavelength.

6. The apparatus according to claim 1, wherein the first diffraction pattern forms a first diffraction image comprising a first set of first spots on the first region, and wherein the second diffraction pattern forms a second diffraction image comprising a second set of second spots on the second region.

7. The apparatus according to claim 1, wherein at least one of the first and the second diffraction patterns forms a diffraction image comprising at least one of a set of lines and an area having graduated intensities.

8. The apparatus according to claim 1, wherein the first region and the second region tile the surface.

9. The apparatus according to claim 1, wherein the first region is bounded by a first rectangle and a second rectangle smaller than the first rectangle, the first and the second rectangles having a common center, and wherein the second region is bounded by the second rectangle.

10. The apparatus according to claim 1, wherein the optically active region of the second DOE is configured to correspond to a cross-section of the zero order beam.

11. A method for projecting a pattern, comprising:
diffracting an input beam with a first diffractive optical element (DOE) so as to generate a first diffraction pattern on a first region of a surface, the first diffraction pattern comprising a zero order beam; and
diffracting the zero order beam with a second DOE, which comprises:
an optically active region configured to receive and diffract the zero order beam so as to generate a second diffraction pattern on a second region of the surface; and
an optically inactive transparent region configured to transmit the first diffraction pattern absent the zero order beam so that the first diffraction pattern is unaltered by the optically inactive transparent region,
such that the first and the second regions together at least partially cover the surface.

12. The method according to claim 11, wherein the optically active region of the second DOE is configured to correspond to a cross-section of the zero order beam.

13. The method according to claim 11, wherein the second diffraction pattern comprises a further zero order beam, and wherein an energy flux of the further zero order beam is less than 0.1% of an energy flux of the input beam.

14. The method according to claim 11, wherein the first diffraction pattern forms a first diffraction image comprising a first set of first spots on the first region, and wherein the second diffraction pattern forms a second diffraction image comprising a second set of second spots on the second region.

15. The method according to claim 11, wherein the first region and the second region tile the surface.

16. The method according to claim 11, wherein the first region is bounded by a first rectangle and a second rectangle smaller than the first rectangle, the first and the second rectangles having a common center, and wherein the second region is bounded by the second rectangle.

* * * * *